(12) United States Patent
Zilban et al.

(10) Patent No.: US 10,261,394 B2
(45) Date of Patent: Apr. 16, 2019

(54) MOBILE PHOTOGRAPHY STUDIO

(71) Applicants: George Zilban, Aventura, FL (US); Marat Binder, Wellington, FL (US)

(72) Inventors: George Zilban, Aventura, FL (US); Marat Binder, Wellington, FL (US)

( * ) Notice: Subject to any disclaimer, the term of this patent is extended or adjusted under 35 U.S.C. 154(b) by 0 days.

(21) Appl. No.: 16/027,784

(22) Filed: Jul. 5, 2018

(65) Prior Publication Data

US 2019/0011806 A1 Jan. 10, 2019

Related U.S. Application Data

(60) Provisional application No. 62/529,602, filed on Jul. 7, 2017.

(51) Int. Cl.
| | |
|---|---|
| *G03B 15/07* | (2006.01) |
| *B62D 63/06* | (2006.01) |
| *B62D 63/08* | (2006.01) |
| *G03B 29/00* | (2006.01) |
| *B62D 53/06* | (2006.01) |
| *B60P 3/025* | (2006.01) |

(52) U.S. Cl.
CPC .......... *G03B 15/07* (2013.01); *B62D 63/061* (2013.01); *B62D 63/08* (2013.01); *G03B 29/00* (2013.01); *B60P 3/025* (2013.01); *B62D 53/067* (2013.01); *G03B 2215/0557* (2013.01)

(58) Field of Classification Search
None
See application file for complete search history.

(56) References Cited

U.S. PATENT DOCUMENTS

| | | | |
|---|---|---|---|
| 4,110,792 A | 8/1978 | Long et al. | |
| 4,771,305 A | 9/1988 | Potoroka | |
| 4,796,537 A | 1/1989 | Besser | |
| 5,247,319 A * | 9/1993 | Hahn | G03B 15/00 396/1 |
| 5,248,180 A * | 9/1993 | Hussaini | B60P 3/34 296/165 |
| 5,478,129 A | 12/1995 | Goto et al. | |
| 6,106,124 A | 8/2000 | Tarsia | |
| 7,360,983 B2 | 4/2008 | Pate | |
| 7,712,813 B2 | 5/2010 | Di Franco | |
| 7,736,116 B2 | 6/2010 | Kozak | |

(Continued)

FOREIGN PATENT DOCUMENTS

WO 2016059666 A1 4/2016

*Primary Examiner* — William B Perkey
(74) *Attorney, Agent, or Firm* — Laurence A. Greenberg; Werner H. Stemer; Ralph E. Locher

(57) ABSTRACT

A mobile photography studio for photographing objects. The studio has a main trailer body having an internal volume defined by a roof, a floor, a front wall, a rear wall, and two side walls. A control computer controls an expansion of the sidewalls of the trailer, and optionally the roof, to expand the internal volume of the trailer. A turntable, which is disposed on the trailer floor supports and rotates the object based on commands from the control computer. At least one camera takes photographs of the object on the turntable based on commands from a camera control computer. A plurality of lights illuminate the object on the turntable based on commands from the control computer. The camera control computer controls the camera(s), and stores and processes the photographs.

12 Claims, 15 Drawing Sheets

(56) References Cited

U.S. PATENT DOCUMENTS

| | | |
|---|---|---|
| 8,418,386 B1 | 4/2013 | Key et al. |
| 9,412,203 B1 | 8/2016 | Garcia, III et al. |
| 9,896,017 B1 * | 2/2018 | Requejo ................... B60P 3/34 |
| 10,085,632 B1 * | 10/2018 | Dishong .................. A61B 3/02 |
| 2004/0183803 A1 | 9/2004 | Longo |
| 2005/0173601 A1 | 8/2005 | Hestand |
| 2014/0152806 A1 | 6/2014 | Hauk |
| 2014/0268627 A1 * | 9/2014 | Contreras, Jr. ....... F21V 21/005 362/11 |
| 2015/0246699 A1 * | 9/2015 | Anabtawi ................ B60D 1/06 280/511 |
| 2015/0365636 A1 | 12/2015 | King |
| 2016/0173740 A1 | 6/2016 | Corby et al. |
| 2016/0381323 A1 | 12/2016 | Garcia, III et al. |
| 2017/0180696 A1 * | 6/2017 | Broughton ........... H04N 5/2354 |
| 2019/0011806 A1 * | 1/2019 | Zilban ................... G03B 15/07 |

\* cited by examiner

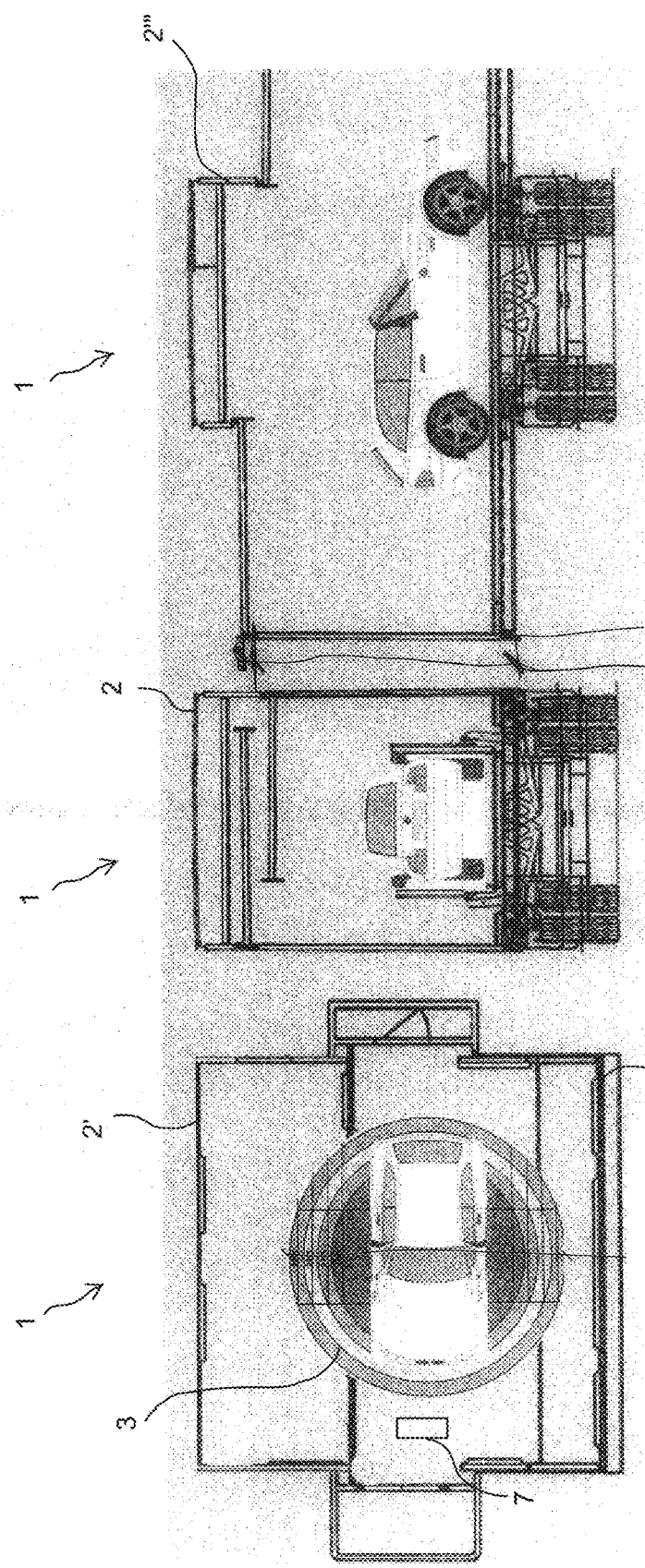

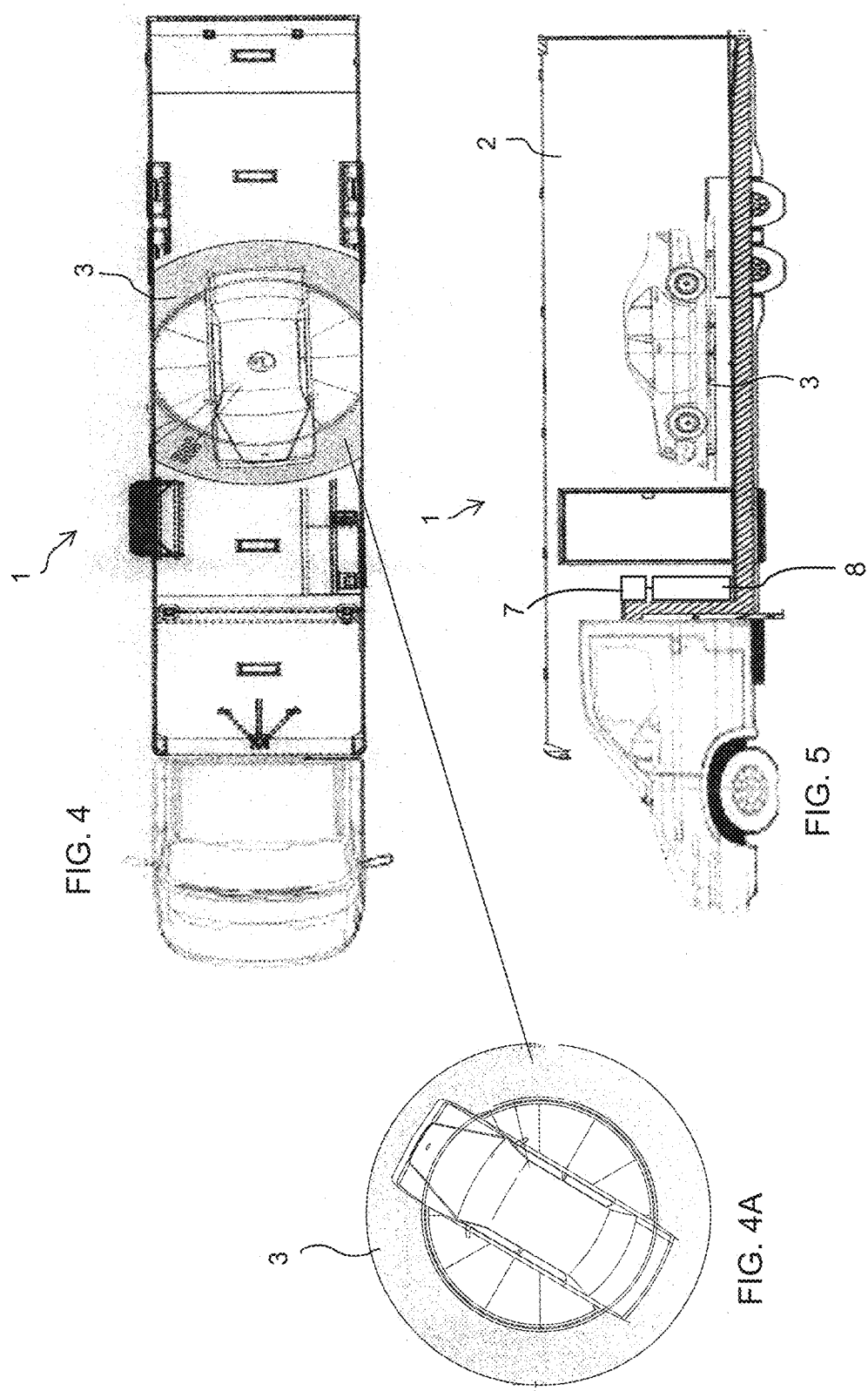

MOBILE PHOTOGRAPHY STUDIO

CROSS-REFERENCE TO RELATED APPLICATION

This application claims the priority, under 35 U.S.C. § 119(e), of provisional application No. 62/529,602 filed Jul. 7, 2017; the prior application is herewith incorporated by reference in its entirety.

BACKGROUND OF THE INVENTION

Field of the Invention

The present invention relates to a mobile photography studio. The mobile photography studio is configured for taking images of large and small objects, such as automobiles, furniture, construction equipment, engines, etc. Additionally, the photography studio can be used for taking images of people and their activities. The images can then be converted into presentation images for online/off-line marketing campaigns. The images produced in the mobile photography studio can be, but are not limited to, digital still pictures, 360° images, 3D images, video, virtual reality VR, and 360° interactively rotatable digital images.

Taking large objects to a studio to photograph 360° interactively-rotatable digital images can be a problematic challenge for many businesses when creating customer accessible online inventory data bases. Having detailed photographs of each inventory item in the automobile industry, furniture industry, construction equipment industry, mannequin-garment industry and other types of business involving the sale of bulky or cumbersome equipment pieces on an online database is important in the current and future sales environment.

As an example, in the automobile marketplace, demand for sellers to have an online presence is ever increasing. The seller must be able to provide potential buyers all pertinent information about the vehicle on an online database; this includes detailed and clear photographs of the vehicles.

When dealing with new cars, a single image can be created for a particular make and model of vehicle which can represent the vehicle that is for sale. In the used car industry, because every car (even the same make and model) can take on unique wear and tear, each individual vehicle in the seller's inventory must be accounted for. This can either involve a multitude of standard 2D digital photographs taken by the seller of each vehicle to upload to an online database, or bringing the vehicles to a photo booth which will create a 360° image of the vehicle.

In the case of 2D inventory photographs, the potential buyer will have to scroll or click through a large amount of photographs of a particular vehicle. The photographs are taken on standard digital cameras on the car lot in non-uniform conditions such as light, weather, and camera positioning by the seller.

In the case of bringing a seller's inventory or bulky, cumbersome, or large object to a 360° imaging facility, transport of the vehicles to and from the facility are a inefficient use of time, money, and wear on the vehicles. Bringing a seller's entire inventory to a separate location to be photographed is neither time nor cost efficient.

The problem therefore arises of creating a mobile photography studio with a controlled photography environment. Additionally, the problem arises of creating a user friendly experience to a potential customer in the form of 360° interactively-rotatable digital images of large, bulky or cumbersome items. Furthermore it shall also be achieved a time and cost efficient way of creating 360° interactively-rotatable digital images of items in a seller's inventory.

SUMMARY OF THE INVENTION

It is accordingly an object of the invention to provide a mobile photography studio which overcomes the above-mentioned and other disadvantages of the heretofore-known devices and which reduces the need for unnecessary movement of inventory, increased efficiency of inventory photography, and decrease in damaged goods.

With the foregoing and other objects in view there is provided, in accordance with the invention, mobile photography studio. The device comprises the following:

a main trailer body having an internal volume defined by a roof, a floor, a front wall, a rear wall, and two side walls;

a control computer;

the two side walls being expandable walls configured to expand from the main trailer body a predetermined distance and increase the internal volume of said main trailer body, the at least two expandable walls being expanded and contracted based on commands from the control computer;

a turntable, disposed on the trailer floor, configured to support and rotate the object based on commands from the control computer;

at least one camera configured to take photographs of the object on the turntable based on commands from a camera control computer;

a plurality of lights configured to illuminate the object on the turntable based on commands from the control computer; and the camera control computer configured to control the at least one camera, and store and process the photographs.

In accordance with an added feature of the invention, the roof is an expandable roof configured to expand from the main trailer body a predetermined distance and increasing the internal volume of the main trailer body, the expandable roof being expanded and contracted based on commands from the control computer.

In accordance with an additional feature of the invention, the turntable has an angle sensor disposed to communicate a relative angle of the turntable to a predetermined point to the camera control computer.

In accordance with another feature of the invention, the camera control computer and the control computer are a single programmed processing unit.

In accordance with a further feature of the invention, the rear wall is a lowerable ramp configured to support objects being loaded into the main trailer body.

In accordance with yet an added feature of the invention, an entrance disposed at the rear wall expands as the expandable sidewalls expand.

In accordance with yet an additional feature of the invention, an entrance is disposed at the rear wall expands as the expandable roof expands.

In accordance with yet a further feature of the invention, an internal liner is configured to cover internal surfaces of the roof, said floor, said front wall, the rear wall, and the two side walls in an expanded state.

In accordance with yet again an added feature of the invention, an internal liner configured to cover internal surfaces of said roof, said floor, said front wall, said rear wall, and said two side walls in an expanded state.

In accordance with yet again an added feature of the invention, at least one axle with at least two wheels is configured to support the main trailer body.

In accordance with an added feature of the invention, at least one trailer hitch is configured to attach the main trailer body to a vehicle capable of moving the mobile photo studio.

In accordance with an additional feature of the invention, the main trailer body is a component part of a semi-trailer truck rig.

Other features which are considered as characteristic for the invention are set forth in the appended claims.

Although the invention is illustrated and described herein as embodied in mobile photography studio, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 shows a top plan view of one embodiment of the mobile photography studio;

FIG. 2 shows a rear elevation view of the mobile photography studio;

FIG. 3 shows a rear elevation view of the mobile photography studio with expanded sidewalls;

FIG. 4 shows a top plan view of a second embodiment of the mobile photography studio;

FIG. 4A shows a top plan view of a turntable with a vehicle isolated from FIG. 4;

FIG. 5 shows a side elevation view of the mobile photography studio;

DETAILED DESCRIPTION OF THE INVENTION

Figure 6:
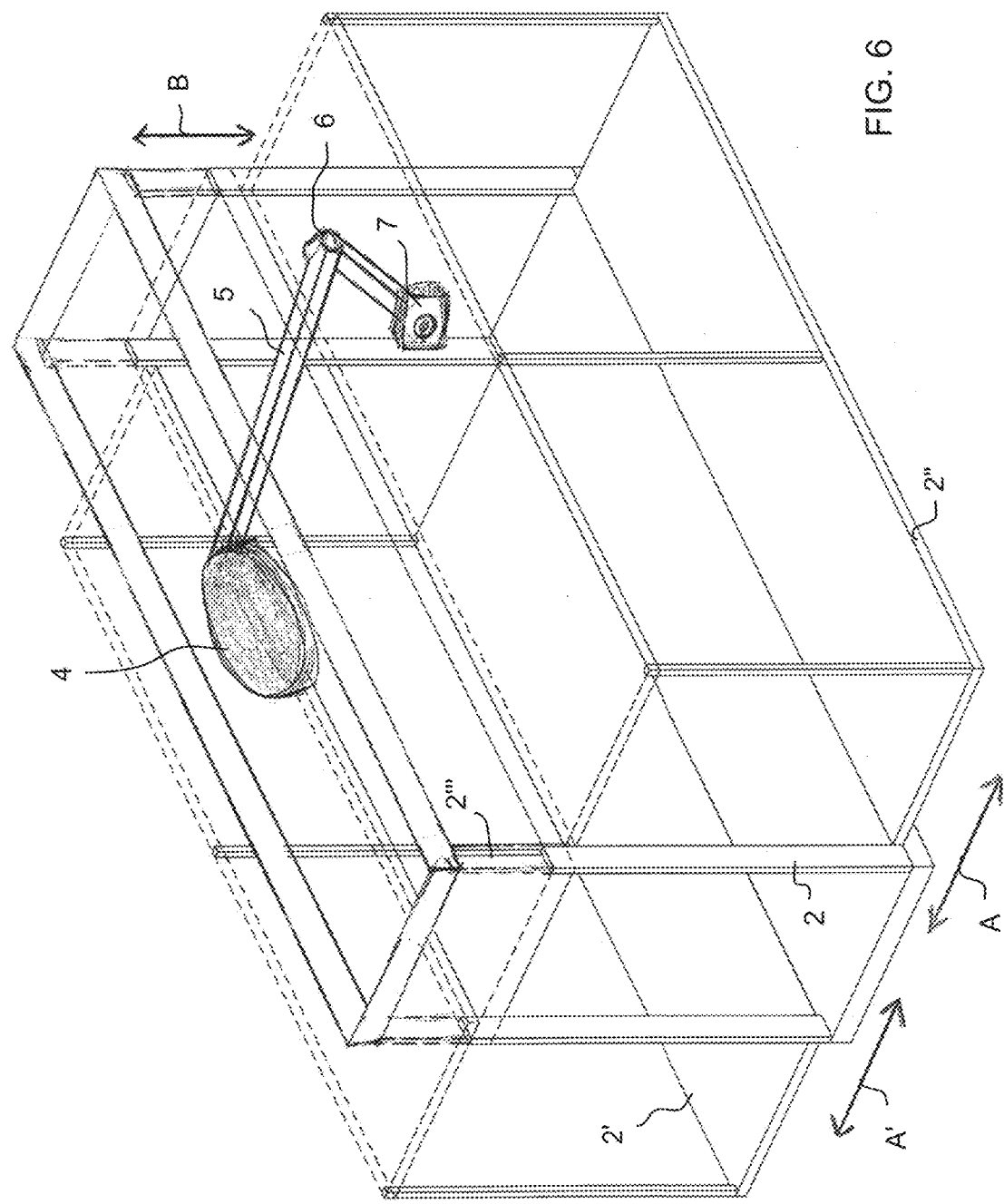
FIG. 6 shows a perspective view of a further embodiment of the mobile photography studio.
Figure 7:
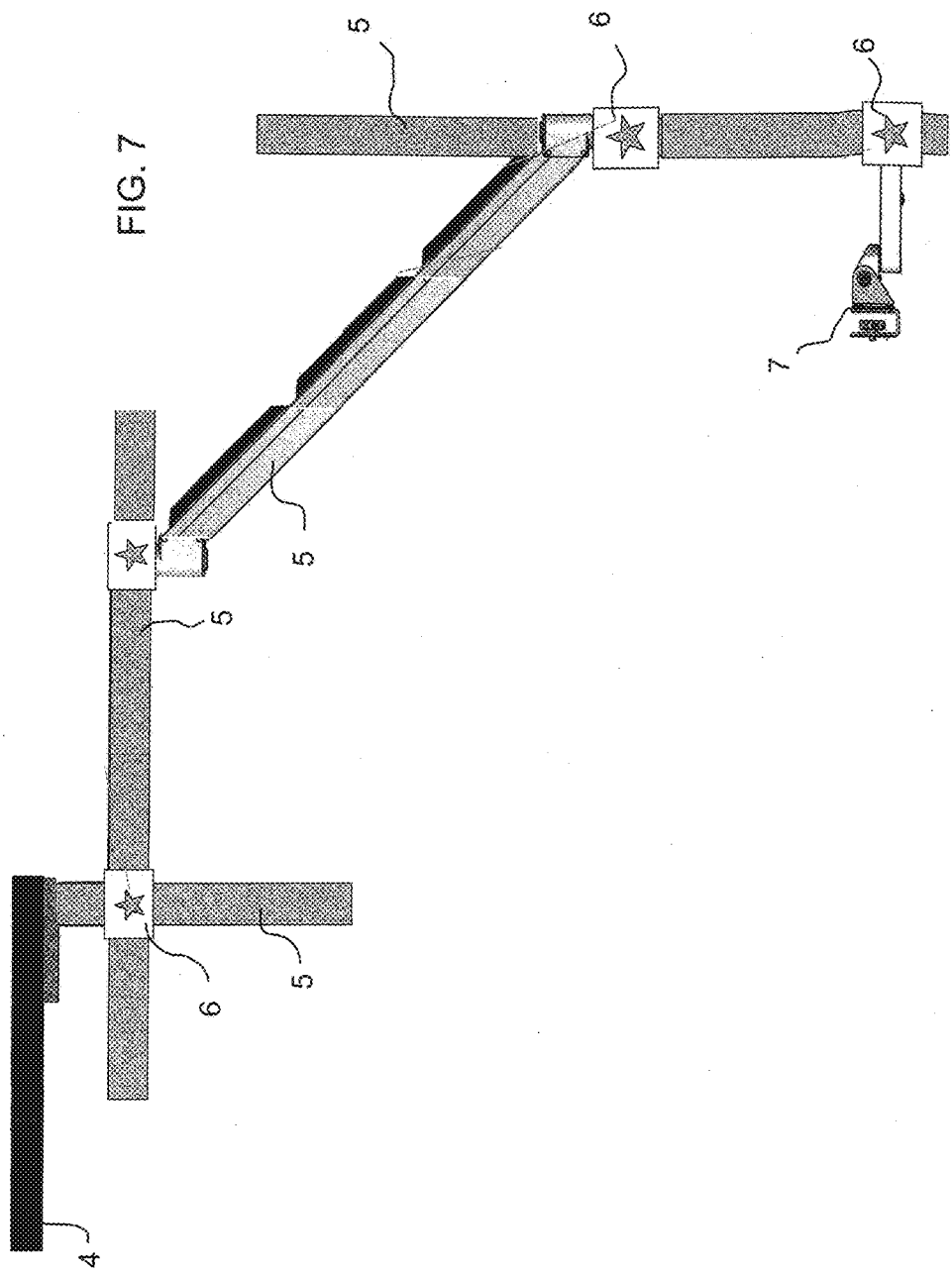
FIG. 7 shows a side elevation view of one embodiment of a rotating camera apparatus for the mobile photography studio.
Figure 8:
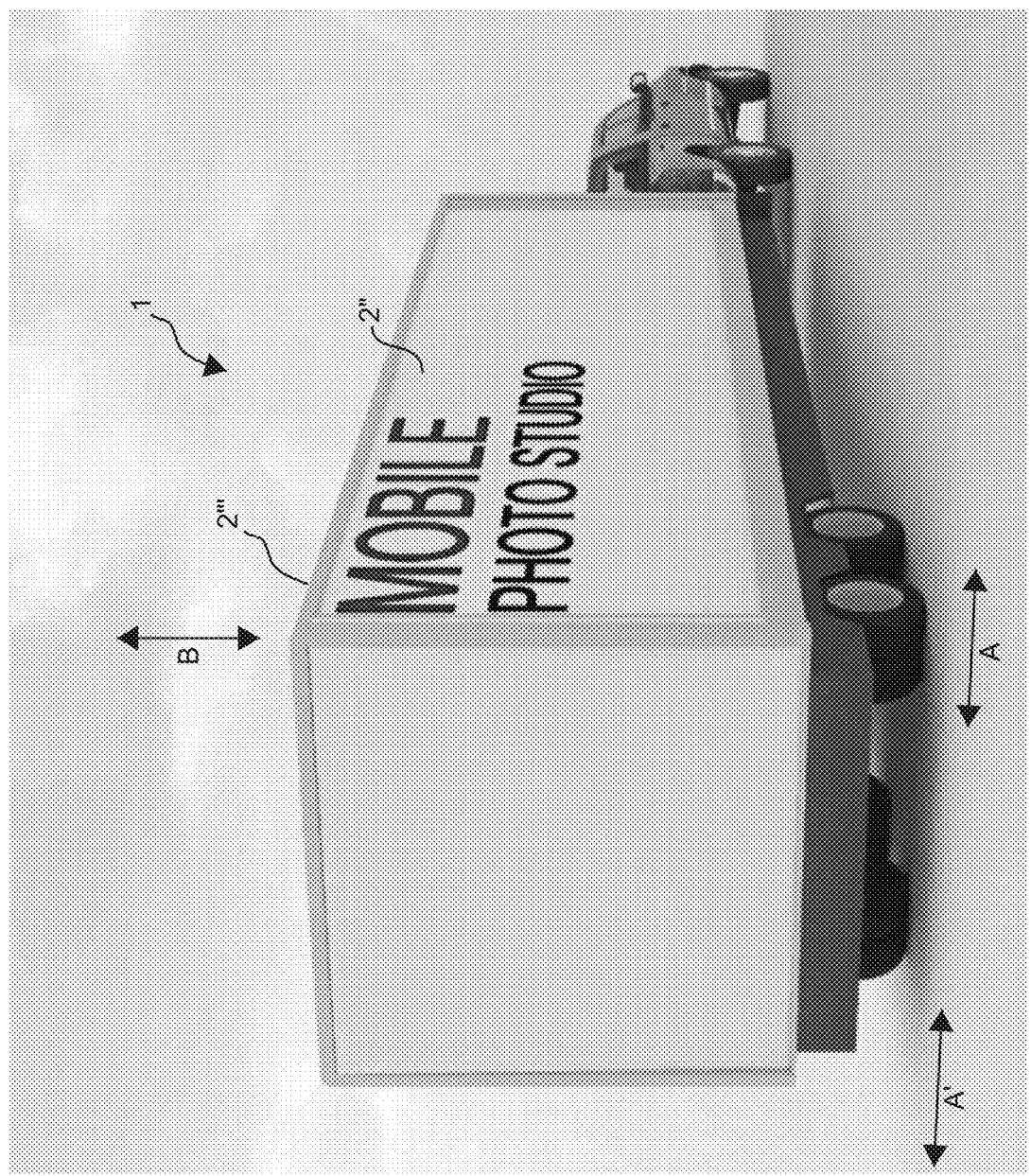
FIG. 8 shows an external perspective view a further embodiment of the mobile photography studio.
Figure 9:
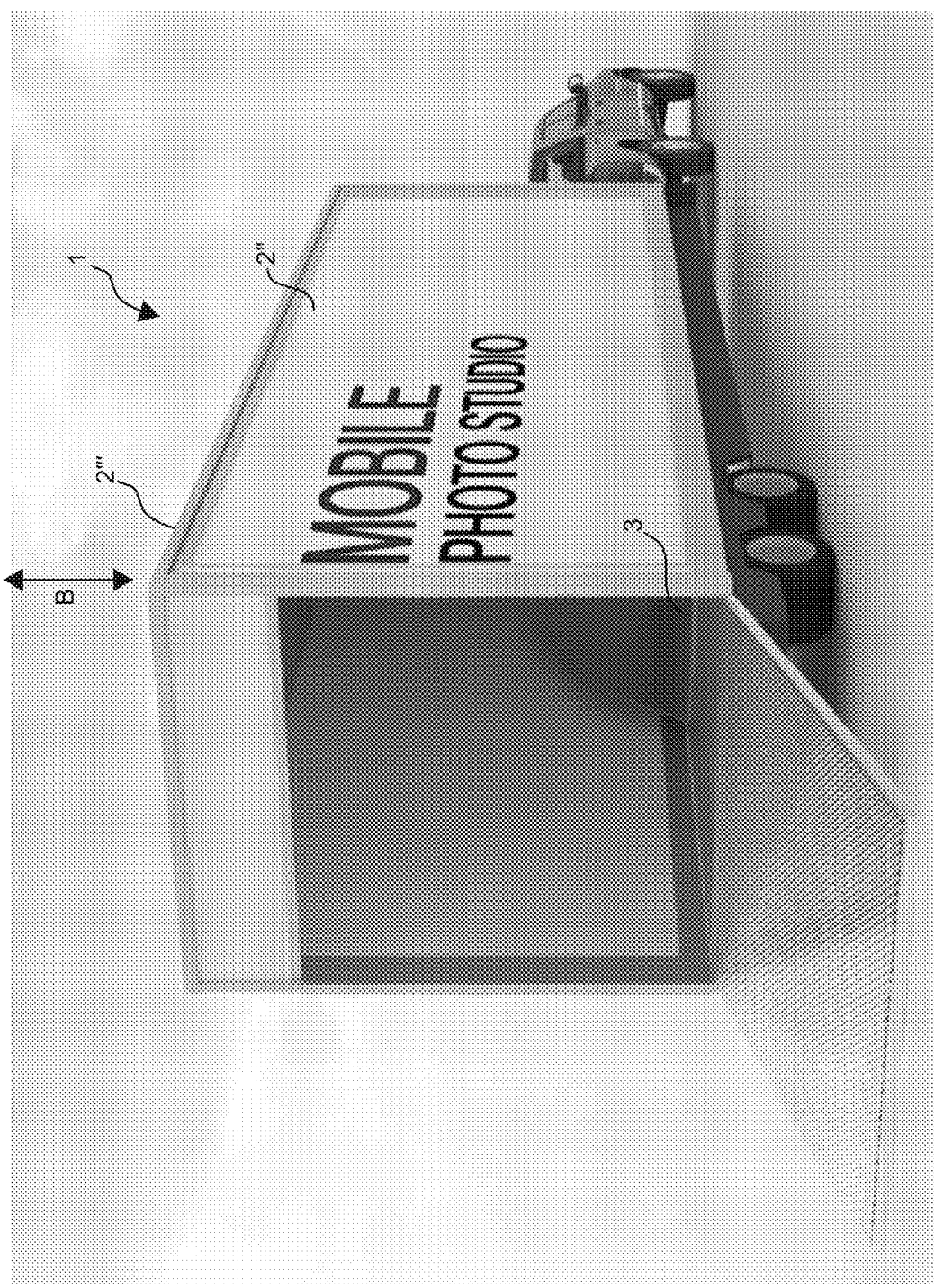
FIG. 9 shows an external perspective view the mobile photography studio.
Figure 10:
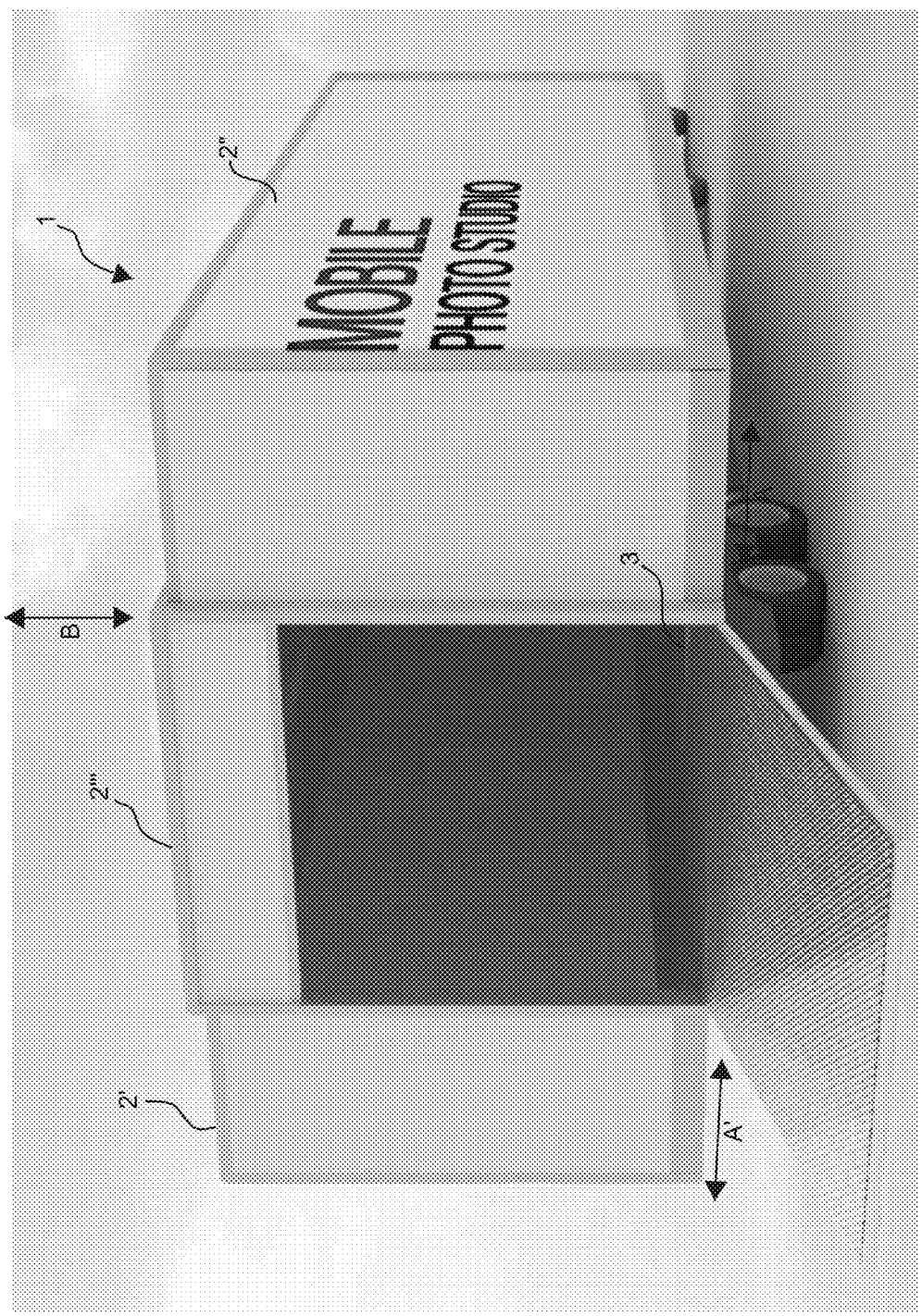
FIG. 10 shows an external perspective view of the mobile photography studio.
Figure 11:
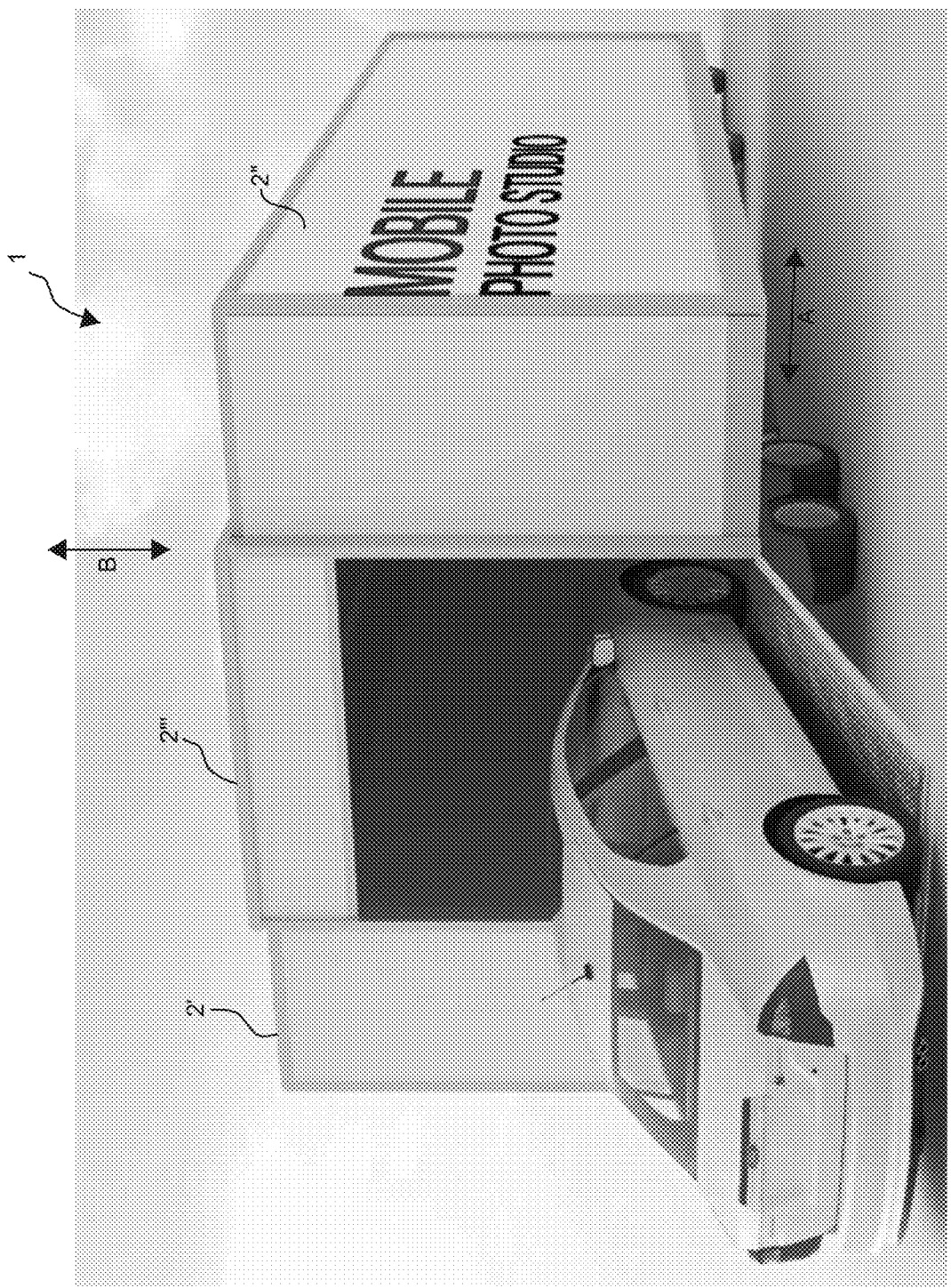
FIG. 11 shows an external perspective view of the mobile photography studio.
Figure 12:
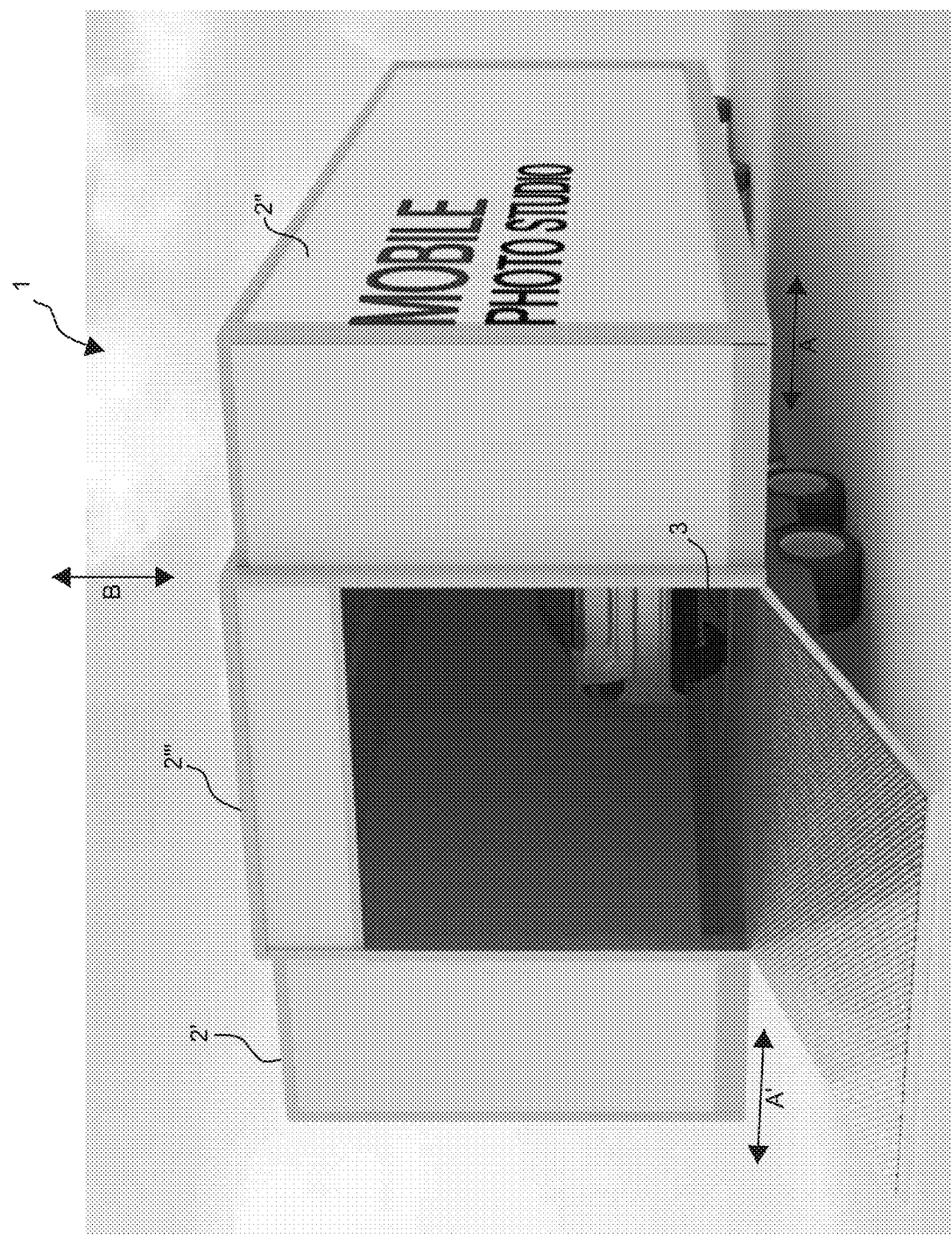
FIG. 12 shows an external perspective view of the mobile photography studio.
Figure 13:
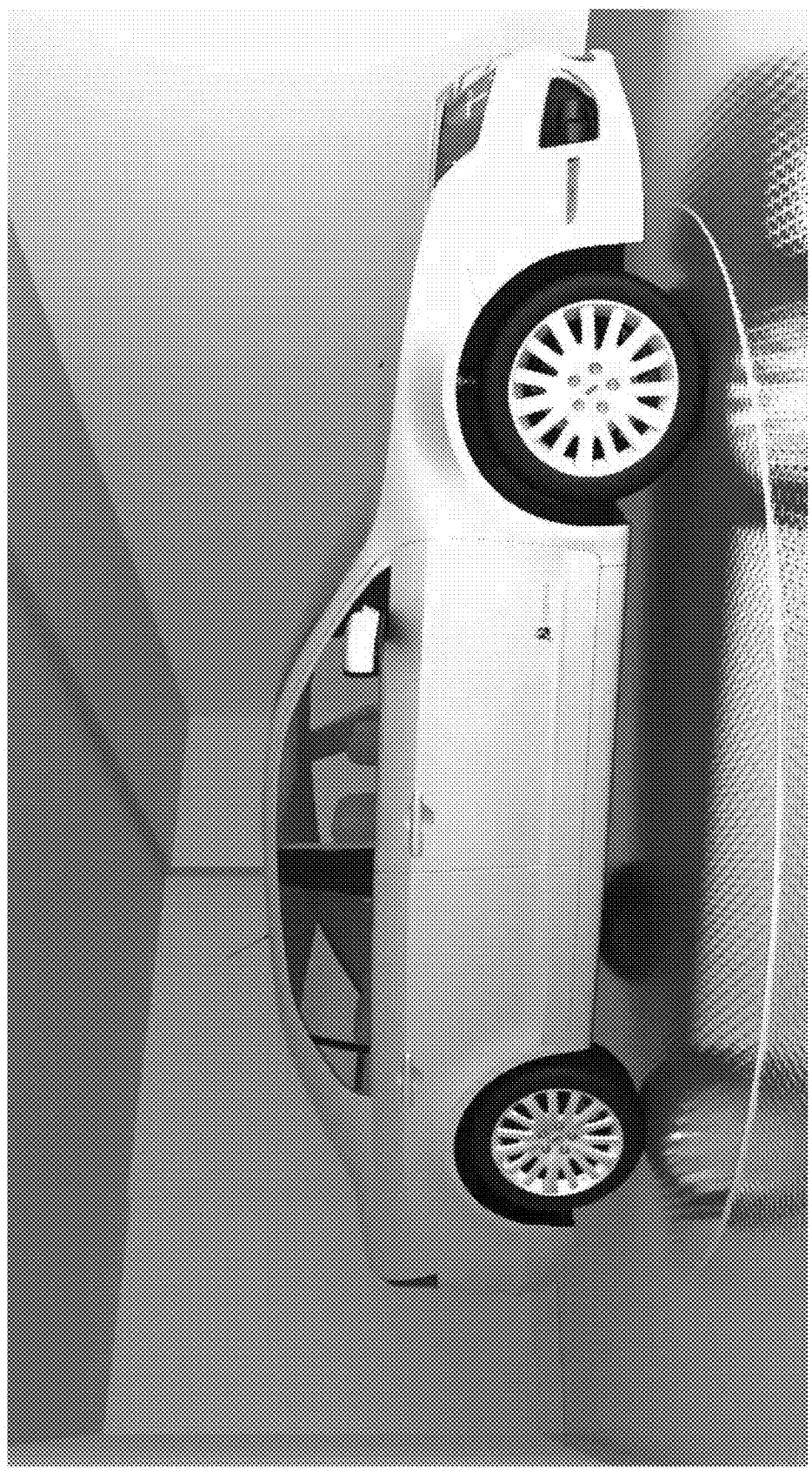
FIG. 13 shows an internal view of an automobile on the turntable inside of the mobile photography studio.
Figure 14:
FIG. 14 shows an internal view of an automobile on the turntable inside of the mobile photography studio.
Figure 15:
FIG. 15 shows an internal view of an automobile on the turntable inside of the mobile photography studio.
Figure 16:
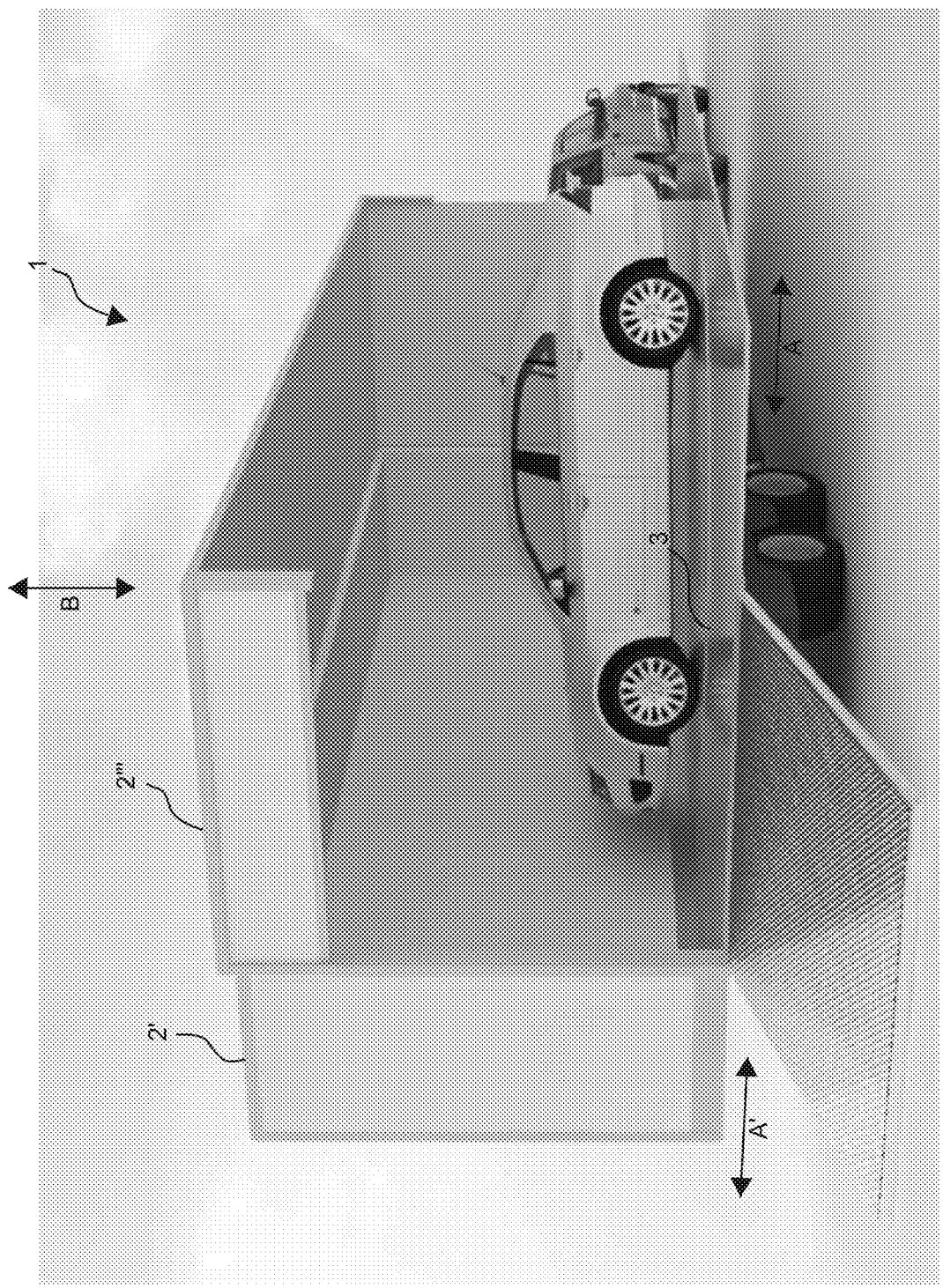
FIG. 16 shows an external perspective view of the mobile photography studio with a sidewall removed.
Figure 17:
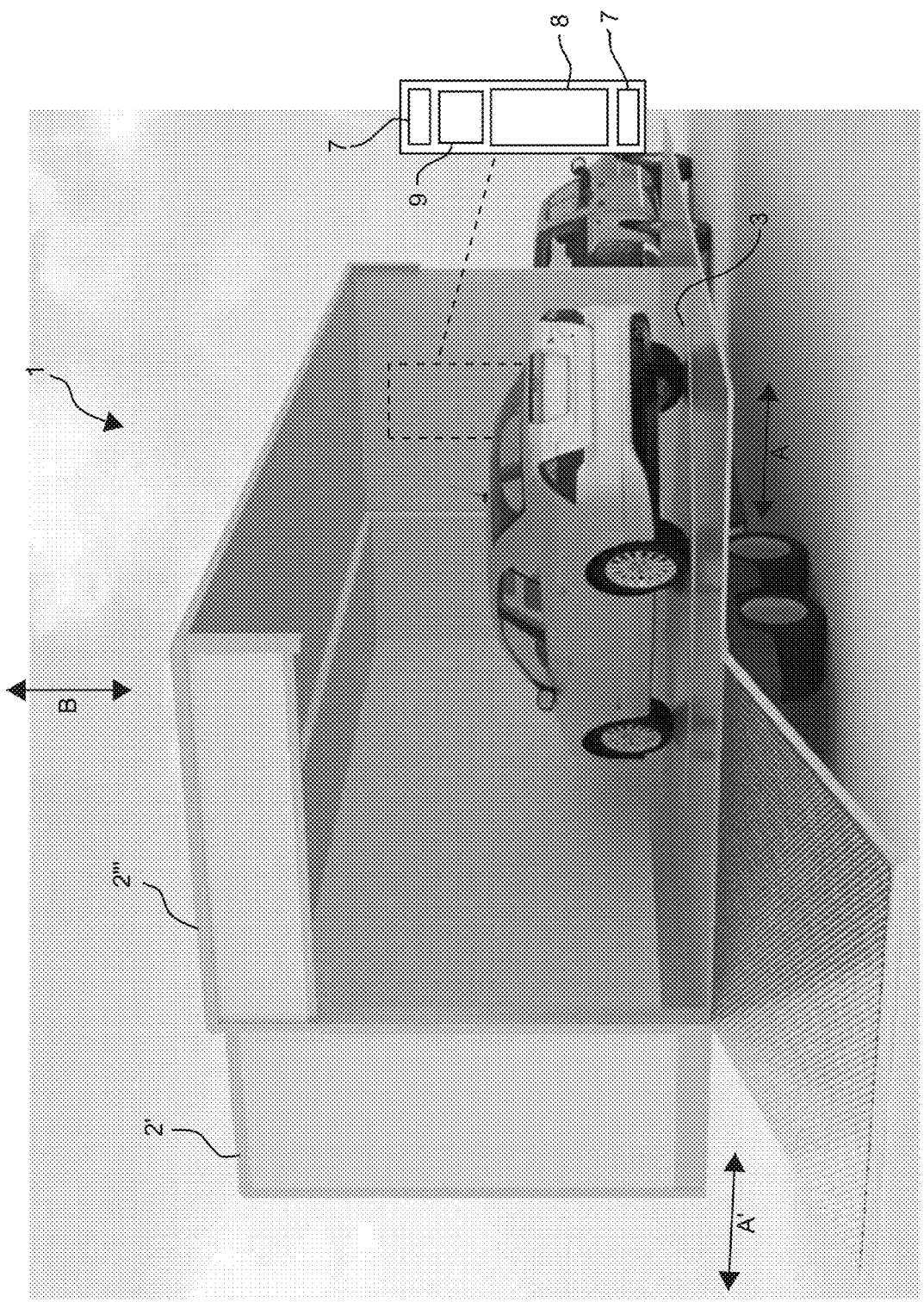
FIG. 17 shows an external perspective view of the mobile photography studio with a sidewall removed.
Figure 18:
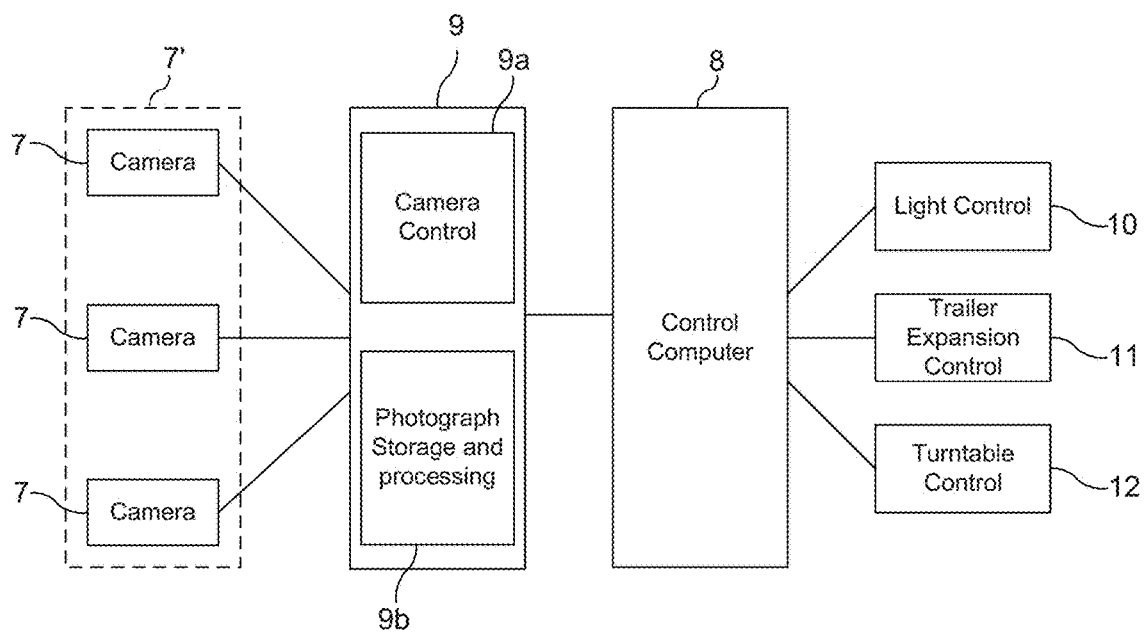
FIG. 18 shows modular diagram of the components controlled by the control computer.

In general, the mobile photography studio 1 comprises a truck or trailer with a cuboid-shaped cargo area/trailer, such as semi-trailer truck or a box-truck. A turntable 3 is positioned inside of the cargo area/trailer and configured to support and rotate large/heavy items in addition to complex items which require special attention. The cargo area/trailer has expandable walls 2' 2" and roof 2''' to accommodate and fit the rotation of items which can be bulkier than a standard trailer width could handle. The studio 1 has at least one camera 7 to take pictures of the item as it is being rotated on the turntable 3, or alternatively, a camera 7 which can be rotated around the vehicle. It is also possible for both systems, namely, the turntable 3 and the rig with the camera(s) 7 to be rotated. The camera 7, in one embodiment, is connected to a computer to process the images in software designed to create 360° interactively-rotatable digital images, virtual reality images, video, processed still images, etc. The inside of the trailer has lights which will create uniform lighting for taking pictures of the items, and with the appearance of continuous, solid walls, create an ideal uniform environment for taking photographs.

The trailer of a semi-trailer truck or box truck is generally about 8 feet wide, commonly in the range of 6.5-9 feet and has an opening at the back end for loading. Comparatively, a standard family sedan is over 14 feet long, so in order to be able to fully rotate large items such as automobiles, commercial equipment, compact excavators, skid steers, compact track loaders, etc., the width of the trailer and the height of the trailer in the present invention are expandable. In regard to the quality of the photograph, this expandability could not come at the cost of a generally solid and uniform interior appearance for the background of the pictures.

In one embodiment, each sidewall 2' 2" of the trailer, and optionally the roof 2", expands outward from a main trailer body 2. Each expandable sidewall 2' 2" and roof 2''' has a frame that, upon activation, moves out from the main trailer body 2 a predetermined distance A A' B. The frame of the expandable sidewalls and ceiling holds paneling on the interior portion which, along with the interior of main trailer body, forms a part of the uniform interior appearance. The trailer sidewalls 2' 2" move outward by mechanically (telescoping support beams, scissor-type extension arms, etc.) expanding to move the sidewall frame and roof outward from the main trailer body 2. In a preferred embodiment, the expansion of the roof 2''' away from the main trailer body 2 will allow for the entrance of the trailer to get taller, allowing for the studio to accommodate taller objects. Additionally, the expansion of the sidewalls 2' 2" away from the main trailer body 2 will allow for the entrance of the trailer to get wider, allowing for the studio to accommodate wider objects.

The support arms of the expandable sidewalls 2' 2" and roof 2''' are expanded by a motor/actuator. The activation of the expansion of the sidewalls 2' 2" and roof 2''' is dependent on commands from the central control computer 8. Alternatively, a separate expansion control computer 11 activates the expandable sidewalls 2' 2" and roof 2''' expansion. In either case, the computer which controls the expansion can be operatively connected to the actuator by data cable/wire or wirelessly connected by a data transmitter(s) and receiver(s). In a further embodiment, the expandable sidewalls 2' 2" and roof 2''' can be manually expanded by an operator pulling or pushing the expandable sidewalls 2' 2" and roof 2''' to the predetermined operable distance from the main trailer body 2.

A turntable/rotation apparatus 3, powered by motor/actuator, is located inside of the trailer, generally centered on the bottom surface/floor of the trailer. The turntable 3 supports the weight of heavy objects in the upward range of 10,000 pounds, (mid-sized cars can weigh over 4,000). These weight indicators are but examples and should not limit the specific implementations. The turntable 3 is positioned generally in the center of the trailer so as to maximize the rotatable area of the large object being rotated when the trailer's sidewalls have been expanded. The rotation of the turntable 3 is dependent on activation by the operator of the photography studio 1 in conjunction with the operation of the photography equipment such as the camera 7, lights 10, and computer software 8.

The turntable 3 and actuator are controlled by the control computer 8 which sends control signals to the actuator by data cable/wire or wirelessly connected by a data transmitter(s) and receiver(s). Alternatively these control signals are controlled by a separate turntable control computer 12. In one preferred embodiment, the turntable has an angle sensor(s) which measures the relative angle of the turntable to the camera (or any predetermined location), and object thereon, and communicates angle information to the control computer 8 and/or the photograph storage and processing 9b for processing individual photographs into a 360° interactively rotatable image. The angle sensor is operatively connected to the actuator by data cable/wire or wirelessly connected by a data transmitter(s) and receiver(s). In a further embodiment, the turntable 3 is controlled manually by a geared crank system which the operator can rotate the loaded turntable 3 manual crank.

In order to create an ideal environment for taking uniform photographs, the interior walls of the trailer would need to be as continuous and solid as possible. The apparatus' required to rotate the large items, expand the sidewalls, and bring the objects in and out of the trailer could potentially disturb the environment. These apparatus' must be hidden from view of the camera, blended into the background, or be easily edited out of photographs. This is achieved by having mostly solid, smooth walls lining the interior of the trailer, having the parts that must be exposed arranged and painted to blend into the interior lining of the trailer, and having the interior be colors that can be easily digitally edited (solid colors such as white, black, and easily contrastable colors such as neon green and blue). Additionally, the interior appearance of the studio can be controlled by an exchangeable hanging backdrops and/or projecting background images, patterns, or solid colors onto the walls.

Playing a key role in creating ideal environment for taking uniform photographs, the lighting arrangement must work together with the interior structure of the trailer. In conjunction with the inner walls, the lighting must be arranged to prevent/reduce shadows throughout the process of rotating and photographing the item. The lighting system 10 puts out either continuous lighting or strobe flashes that are synchronized with the camera 7 shutters. The interior design of the studio is configured to be operated no matter of the outside condition of weather, time of day, lighting, or location.

Located inside of the trailer, a stationary camera 7 is positioned to take pictures of items placed on the turntable 3. A plurality of cameras 7 can be used at different height intervals to ensure a full range of angles are photographed to put together a digital 360° image of the item. The activation of the camera 7 would be dependent on the operator of the photography studio 1 in conjunction with the operation of the other photography equipment such as the lights 10, turntable 3, and computer software 8. The camera(s) 7 are operatively connected to the control computer 9 (or 8) by data cable/wire or wirelessly connected by a data transmitter(s) and receiver(s). When the photographing process is initiated, the camera(s) 7 will take pictures at given intervals as the turntable 3 rotates the large item (or the camera 7 rotates around the item), or the camera 7 will take images continuously. A camera 7 can optionally be connected to arms 5 and adjusting devices 6 which connects the camera 7 to a rotation device 4 mounted to the ceiling of the studio 1. The rotating camera 7 can be used in conjunction with or independently of a stationary camera 7 and turntable 3. Furthermore, the stationary camera(s) 7, rotating camera(s) 7, lights 10, and turntable 3 can all be activated independently of each other.

As a further embodiment, in addition to the stationary camera(s) 7 and rotational camera(s) 7, a portable camera(s) for photographing the interior of the item in the photography studio is included. As an example, for creating a 360° image of the inside of a dresser, internal components of large equipment, the interior of an automobile, etc.. The portable camera can be operated by a person, or on a stand which can be placed in an advantageous location to photograph the desired interior detail.

A main camera control computer(s) 9 is configured to receive the multitude of images from the camera, and through software, the computer 9b will create a 360° interactively-rotatable digital image, or other desired image formats, of the large item. This image will then able to be uploaded onto the seller's inventory database or internal database. This computer 9 could be a same computer 8 which operates the entirety of the equipment of the photography studio or a separate computer 9 specifically for processing the images. Alternatively, the images can be transferred from the camera/studio wirelessly, in a storage medium, etc. for further processing the images.

As an example of use of the mobile photography studio, a pre-owned car dealership would bring the mobile photography studio 1 to their inventory lot. The trailer would be positioned so that inventory items, automobiles, could be driven in and out of the trailer by either lowering a ramp leading to the interior of the trailer 1 or by positioning the trailer at a loading dock. The expanding walls 2' 2" would be activated by an operator via control computer 8 and expand the side walls to a predetermined operating width A A' B. A first vehicle would be driven into the trailer and positioned on the turntable 3 so that a safe rotation of the vehicle could be achieved. The operator would then initiate the photographing process via camera control computer 9 and the camera control 9a. Camera control computer 9 can be configured as a part of control computer 8 or as a separate computer. Photographs are taken in conjunction with the rotation of the vehicle on the turntable 3, the lights 10, and the camera 7. The images are provided to the processing computer 9b for creating a 360° interactively-rotatable digital image(s), or other desired format. Once the vehicle has been photographed, that vehicle can be removed from the trailer 1, and a subsequent vehicle can be brought into the trailer 1 for the photographing process to be initiated again.

Camera module 7' is an arrangement of a single camera 7 or a plurality of cameras 7 which are controlled by a camera control computer 9. Camera control computer 9 controls the operation of the cameras 7 via camera control 9b. Camera control computer 9 processes and/or stores the photographs and video captured by the cameras 7 of camera module 7' via processing computer 9b. Camera control computer 9 is integrated with control computer 8, or alternatively, separate from control computer 8. Control computer 8 controls the operation of the lighting 10, the trailer expansion 11, and turntable control 12. Control computer 8 can be disposed inside of the trailer 2 of the mobile photography studio 1 or separate from the trailer 2. The control connections between the cameras 7, camera control computer 9, control computer 8, light control 10, trailer expansion control 11, and turntable control 12 can through wire connection, or wireless transmission between the components.

This example should not limit the present invention. Similarly, furniture or large equipment can be brought into the trailer to be photographed in the same way. The mobile photography studio 1 can be used to take images of people doing activities, such as modeling clothing, playing music, doing yoga, etc. The mobile photography studio is a portable controlled environment designed to give the user controlled, consistent, known conditions for taking pictures, video, processable digital images of anything desired.

The following is a summary list of reference numerals and the corresponding structure used in the above description of the invention:

1 mobile photography studio
2 main trailer body
2' expandable wall
2" expandable wall
2'" expandable roof
3 turntable
4 rotation device
5 arm
6 adjusting device
7 camera
8 control computer
9 camera control computer
10 light control
11 trailer expansion control
12 turntable control

The invention claimed is:

1. A mobile photography studio for photographing an object comprising:
   a main trailer body having an internal volume defined by a roof, a floor, a front wall, a rear wall, and two side walls;
   a control computer;
   said two side walls being expandable walls configured to expand from said main trailer body a predetermined distance and increase the internal volume of said main trailer body, said at least two expandable walls being expanded and contracted based on commands from said control computer;
   a turntable, disposed on said trailer floor, configured to support and rotate the object based on commands from said control computer;
   at least one camera configured to take photographs of the object on said turntable based on commands from a camera control computer;
   a plurality of lights configured to illuminate the object on said turntable based on commands from said control computer; and
   said camera control computer being configured to control said at least one camera, and store and process the photographs.

2. The mobile photography studio according to claim 1, wherein said roof is an expandable roof configured to expand from said main trailer body a predetermined distance and to increase the internal volume of said main trailer body, said expandable roof being expanded and contracted based on commands from said control computer.

3. The mobile photography studio according to claim 1, wherein said turntable has an angle sensor disposed to communicate a relative angle of the turntable to a predetermined point to said camera control computer.

4. The mobile photography studio according to claim 1, wherein said camera control computer and said control computer are a single programmed processing unit.

5. The mobile photography studio according to claim 1, wherein said rear wall is a lowerable ramp configured to support objects being loaded into said main trailer body.

6. The mobile photography studio according to claim 1, wherein an entrance disposed at said rear wall expands as said expandable sidewalls expand.

7. The mobile photography studio according to claim 2, wherein an entrance disposed at said rear wall expands as said expandable roof expands.

8. The mobile photography studio according to claim 1, which further comprises an internal liner configured to cover internal surfaces of said roof, said floor, said front wall, said rear wall, and said two side walls in an expanded state.

9. The mobile photography studio according to claim 2, which further comprises an internal liner configured to cover internal surfaces of said roof, said floor, said front wall, said rear wall, and said two side walls in an expanded state.

10. The mobile photography studio according to claim 1, which further comprises at least one axle with at least two wheels configured to support said main trailer body.

11. The mobile photography studio according to claim 10, which further comprises at least one trailer hitch configured to attach said main trailer body to a vehicle capable of moving the mobile photo studio.

12. The mobile photography studio according to claim 10, wherein said main trailer body is a component part of a semi-trailer truck rig.

* * * * *